United States Patent [19]

Kosugi et al.

[11] Patent Number: 4,795,118

[45] Date of Patent: Jan. 3, 1989

[54] CAMERA SUPPORTING DEVICE

[75] Inventors: Yoshinobu Kosugi; Tadashi Idota, both of Sayama, Japan

[73] Assignee: Slik Tripod Co., Ltd., Saitama, Japan

[21] Appl. No.: 103,929

[22] Filed: Oct. 2, 1987

[30] Foreign Application Priority Data

Feb. 24, 1987 [JP] Japan ................................. 62-40942
Jun. 3, 1987 [JP] Japan ................................. 62-139403

[51] Int. Cl.[4] ........................ F16M 11/04; G03B 17/56
[52] U.S. Cl. ................................. 248/181; 248/288.5; 354/293; 403/90; 403/138; 403/115
[58] Field of Search ....................... 248/179, 181, 288.5, 248/187, 481; 354/81, 82, 293, 295; 352/243, 195; 403/90, 138, 144, 115

[56] References Cited

U.S. PATENT DOCUMENTS

| 2,700,523 | 1/1955 | Polland | 248/181 |
| 3,737,130 | 6/1973 | Shiraishi | |
| 3,924,828 | 12/1975 | Epperson | |
| 4,214,724 | 7/1980 | Geiger | |

FOREIGN PATENT DOCUMENTS

| 139216 | 10/1934 | Austria | |
| 540163 | 11/1931 | Fed. Rep. of Germany | 248/181 |
| 292576 | 1/1932 | Italy | 248/181 |
| 583940 | 10/1958 | Italy | 403/90 |
| 49-43324 | 11/1974 | Japan | |
| 125909 | 8/1949 | Sweden | 248/181 |
| 618296 | 2/1949 | United Kingdom | 248/181 |

OTHER PUBLICATIONS

Material 1—Advertisement Appearing in Japanese Magazine "Asahi Camera" (Jan. 1971).
Material 2—Advertisement Appearing in Japanese Magazine "Asahi Camera" (Mar. 1971).

Primary Examiner—Alvin C. Chin-Shue
Attorney, Agent, or Firm—Frishauf, Holtz, Goodman & Woodward

[57] ABSTRACT

A body of a camera supporting device according to the present invention is provided with a grip which is shaped so as to permit a one-handed hold, and which incorporates a trigger. A shoe mounting surface is formed on the top of the body, and a shoe is mounted rotatably and detachably on the mounting surface. The shoe is fitted with a camera screw. A ball is fixed on a fixed base which is mounted on a tripod, and is rotatably housed in a cylindrical ball case. The ball case and the body are connected to each other. The ball is held between an edge of the ball case and a ball retainer by means of the urging force of a compression coil spring. The ball retainer can be moved away from the ball, by means of a link mechanism, by squeezing the trigger, thereby permitting orientation in all directions of a camera mounted on the shoe mounting surface. The camera is locked in position when the trigger is released.

22 Claims, 6 Drawing Sheets

CAMERA SUPPORTING DEVICE

BACKGROUND OF THE INVENTION

The present invention relates to a camera supporting device used for mounting a camera on a tripod, and, more specifically, to the improvement of a camera supporting device having a pistol-grip type handle which incorporates a trigger.

A typical conventional tripod head comprises a base mounted on the top end of a tripod, a pan member rotatable around the vertical axis, a tilt member rotatable around the horizontal axis, and a camera platform mounted on the top of the tilt member. The camera platform has a camera screw for fixing a camera. If the tripod head is of the so-called three-way type, the camera platform is movable from a horizontal position to a vertical position, with respect to the tilt member.

The conventional tilt member is fitted with a pan handle which has a male screw at the extreme end portion thereof. The pan handle is used for horizontal panning and vertical tilting. By turning the pan handle clockwise, the tilt member can be locked at a desired angle of inclination, and unlocked therefrom by turning the pan handle counterclockwise.

The conventional pan member is provided with a panning lock knob, and can be locked in place or released by manually rotating the knob in alternate directions. If the tripod head is of the three-way type, moreover, then the tilt member also has a tilt lock knob, the rotating of which, in alternate directions, enables the camera platform to be fixed in place or released.

In the case of the prior art tripod head, as described above, the pan handle and the knobs must be turned several times in order to control the pan member, the tilt member, and/or the camera platform, with the result that any adjustment of the camera angle is unnecessarily complicated and time-consuming.

Disclosed in U.S. Pat. No. 3,924,828, to Epperson, is a tripod head which comprises a pistol-grip type handle incorporating a trigger. With this tripod head, when the trigger is released by pressure applied thereto, a clamping bracket is tightened on a trunnion by means of the urging force of a coil spring, and at the same time, a head bracket is tightened on the clamping bracket. As a result, a camera platform is fixed in place, and can be reoriented only by squeezing the trigger again. By doing this, both of the brackets are released from the urging force of the spring, with the result that the clamping bracket can be oriented around the trunnion, while the head bracket can be oriented around a clamp rod which extends at right angles to the trunnion.

According to this prior art tripod head, however, the trunnion and the clamp rod, which serve as the centers of rotation of the clamp bracket and the head bracket, respectively, are arranged in a vertically offset manner, and therefore, the handle cannot be moved smoothly.

Japanese Patent Publication No. 49-43323 discloses a ball-type tripod head which is provided with a ball joint for enabling it to be oriented in all directions. According to this prior art arrangement, however, the ball joint is operated by means of a hydraulic cylinder. Therefore, it is liable to suffer from leakage of oil during use. Furthermore, since it does not have a pistol-grip type handle, the ball head cannot easily be operated with one hand.

With conventional tripod heads, including the prior art types described above, a camera screw must be turned every time a camera is attached thereto or detached therefrom. This method of attaching and detaching the camera is clearly bothersome and time-consuming.

SUMMARY OF THE INVENTION

Accordingly, a first object of the present invention is to provide a camera supporting device in which a camera can be oriented in all directions, and be fixed securely at a desired orientation, by simple operations compared with prior arts descried above. A second object of the invention is to facilitate attachment and detachment of a camera shoe to and from a body of the camera supporting device.

In order to achieve the above objects, according to the present invention, there is provided a camera supporting device which is adapted to be mounted on a tripod, the device comprising a fixed base mountable on a tripod; a post provided on the fixed base; a ball mounted on the top end of the post; a cylindrical ball case for rotatably holding the ball, the ball case having a pair of open ends, one of the open ends having an edge on the inside thereof in contact with the ball; a body connected to the ball case and having a shoe mounting surface; a ball retainer disposed on the other of the open ends of the ball case and being movable along the axis of the ball case, the ball retainer having a surface in contact with the ball; a compression coil spring means disposed inside the body for urging the ball retainer toward the ball; a link mechanism attached to the body for driving the ball retainer in a direction such that the ball retainer moves away from the ball, against the urging force of the coil spring means; a grip substantially continuous with the body and shaped so as to permit a one-handed hold thereof; a trigger rockably mounted on the grip, the link mechanism being movable in a direction such the ball retainer moves away from the ball when the trigger is squeezed; a shoe fitted with a camera screw, the extreme end of the camera screw projecting from the upper surface of the shoe; and a shoe fixing/releasing means for detachably fixing the shoe to the shoe mounting surface of the body.

In the camera supporting device described above, when the trigger is squeezed, its motion is transmitted to the ball retainer through the link mechanism. Thereupon, the ball retainer moves away from the ball, so that the urging force of the compression spring means ceases to act on the ball. Accordingly, the body, which is connected to the ball case, is allowed to move freely with respect to the ball. Thus, the camera can be moved in all directions by moving the grip while keeping the trigger squeezed.

If the trigger is released after the direction of the camera is adjusted, the ball is clamped strongly between the edge of the ball retainer and the ball case by the urging force of the compression spring means. Consequently, the ball and the ball case are fixed to each other, so that the body is also fixed.

According to the present invention, the camera angle can be fixed and released one-handed, and the camera can be oriented in any desired direction, by simple operations using the grip and trigger. Also, the camera can be fixed at once by a simple operation, that is, by releasing a hold on the trigger.

Since the shoe can be removably attached to the shoe mounting surface of the body, moreover, the camera can be easily attached to or detached from the camera supporting device by means of the shoe, if the shoe is only mounted on the camera.

DETAILED DESCRIPTION OF THE PREFERRED EMBODIMENTS

Figure 1:
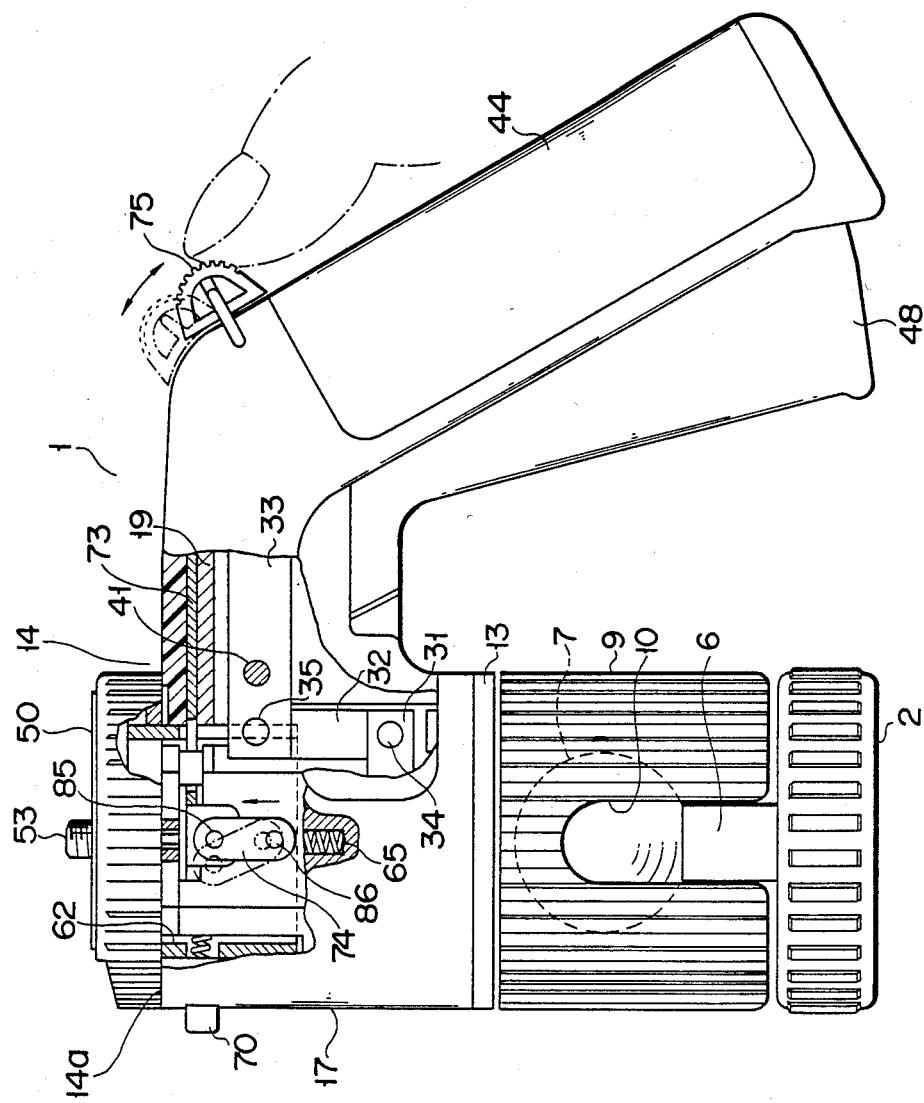
FIG. 1 is a side view, partially in section, showing a camera supporting device according to an embodiment of the present invention.
Figure 2:
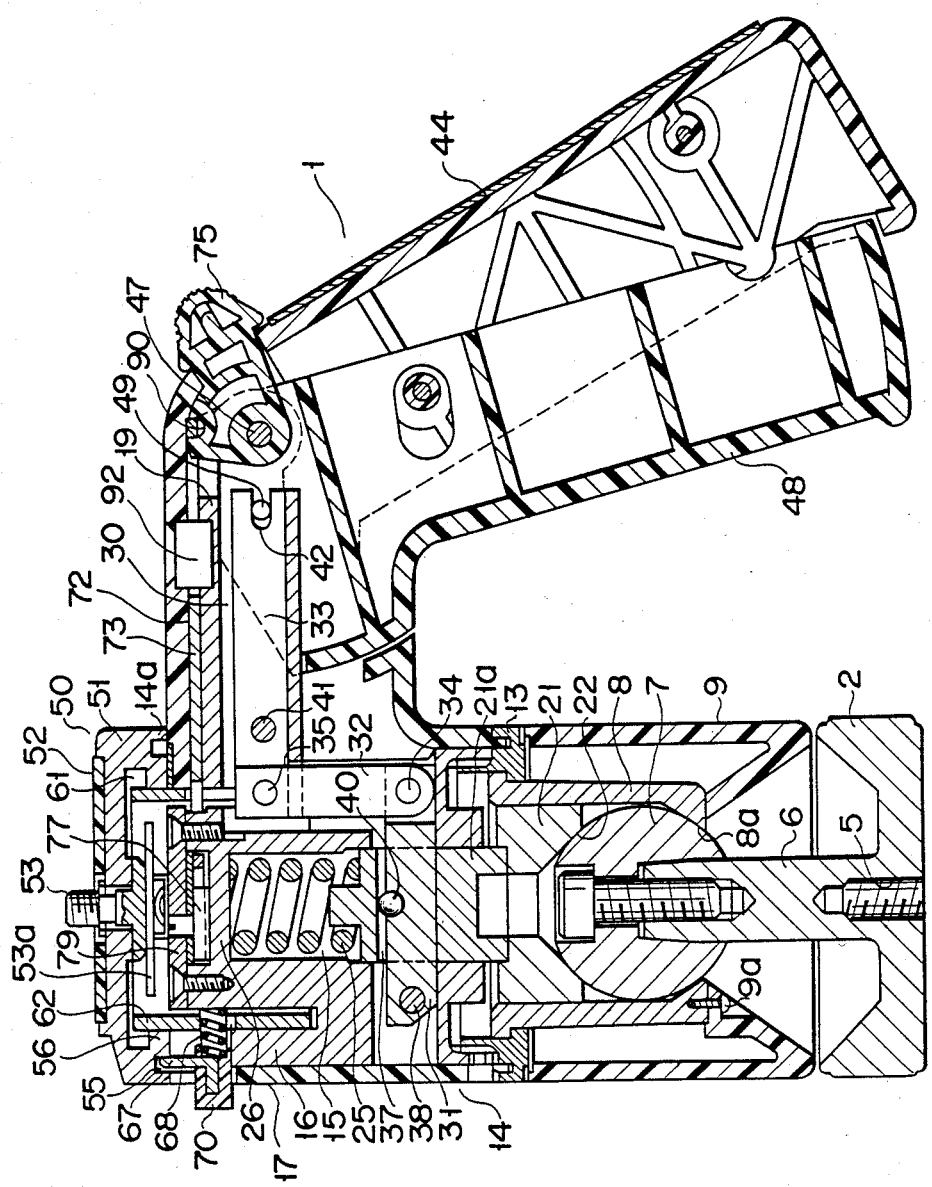
FIG. 2 is a longitudinal sectional view of the camera supporting device shown in FIG. 1.
Figure 3:
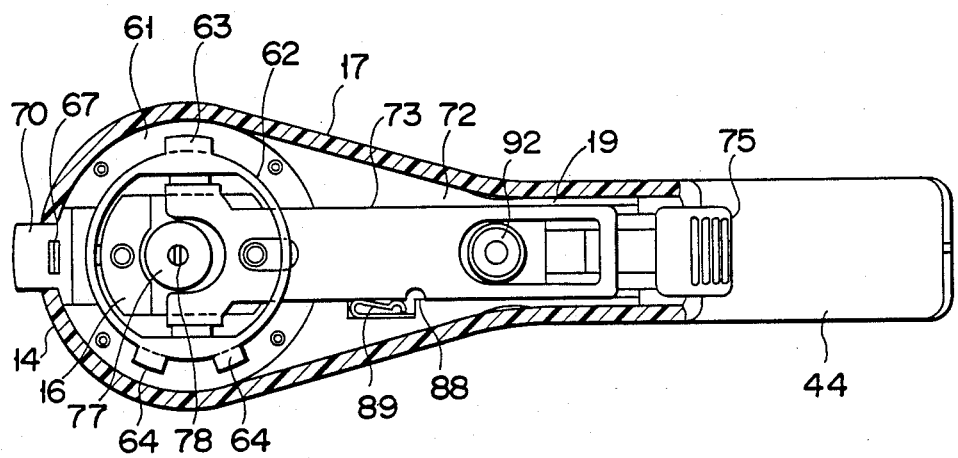
FIG. 3 is a plan view, partially in section, showing the camera supporting device shown in FIG. 1.
Figure 4:
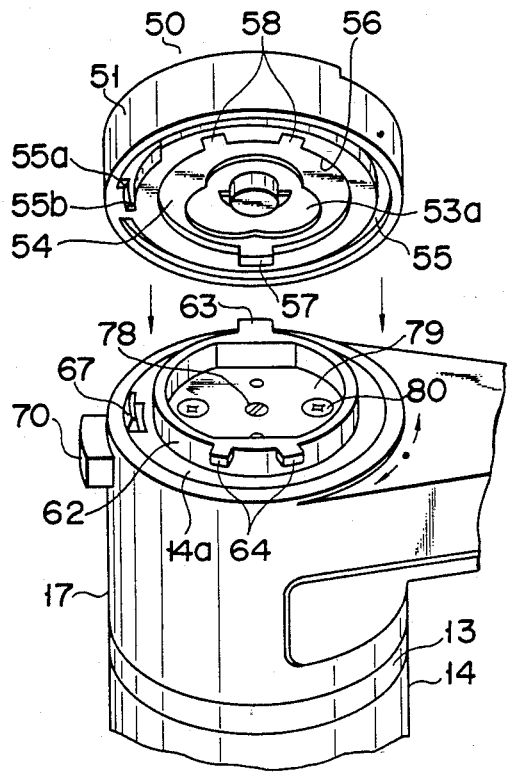
FIG. 4 is a partial perspective view showing a shoe and a body of the camera supporting device shown in FIG. 1.

Referring now to FIGS. 1 to 8, an embodiment of the present invention will be described. Camera supporting device 1 of the invention comprises fixed base 2 at the lower end portion thereof. Base 2 is mounted to supporting portion 4 at the top end of conventional tripod 3 (see FIG. 7). Threaded socket 5 (see FIG. 2) is formed in the central portion of base 2. Socket 5 is adapted to mate with a screw (not shown) which protrudes from supporting portion 4.

Columnar post 6 is provided on fixed base 2, and ball 7 is attached to the upper end of the post. Ball 7, post 6, and base 2 are made of metal.

Ball 7 is contained in metallic ball case 8 for relative rotation. Case 8 is in the form of a hollow cylinder open at both upper and lower ends. Edge 8a is formed inside the lower open end of case 8. It is adapted to be in sliding contact with the bottom portion of ball 7. Cylindrical resin cover 9 is fixed to the outside of ball case 8 by means of screw 9a. As is shown in FIG. 1, cover 9 is formed with notch 10, which has a size such that post 6 can fall thereinto.

Ball case 8 is rotatably coupled to body 14 by means of ring-shaped metal fitting 13. Body 14 is metal frame 16 having a bore 15 formed therein and resin housing 17 surrounding the frame. Housing 17 is fixed to frame 16 by means of screws (not shown). Trigger supporting portion 19 (see FIGS. 1 and 6) extends horizontally from one side of frame 16.

Ball retainer 21 is disposed on the upper end side of ball case 8. Tapered surface 22, adapted to be in sliding contact with the top portion of ball 7, is formed on the underside of retainer 21. The ball retainer includes columnar portion 21a, which is slidably held in bore 15 of frame 16. Ball retainer 21 is made of metal.

Further, bore 15 contains compression coil spring 25. Spring 25 is held compressed between ceiling wall 26 of frame 16 and columnar portion 21a of ball retainer 21. Thus, spring 25 serves to press retainer 21 toward ball 7.

Link mechanism 30 includes three metal links 31, 32 and 33 and shafts 34 and 35. Columnar portion 21a of ball retainer 21 is diametrically penetrated by hole 37. First link 31 is passed through hole 37 and pivotally mounted on frame 16 by means of pin 38. Steel ball 40, which is disposed on the upper surface of link 31, is in contact with columnar portion 21a. Link 33 is rockable around pin 41 which is mounted on frame 16. If third link 33 rocks around pin 41 in the clockwise direction of FIG. 2, second link 32 ascends. As link 32 rises in this manner, first link 31 rocks counterclockwise around pin 38. Notch 42 is formed at the other end of link 33.

Grip 44, which is made of synthetic resin, is formed integrally with housing 17. It is shaped so that it can be grasped one-handed. Grip 44 is fitted with trigger 48 which is rockable around shaft 47. Horizontal pin 49, which is attached to trigger 48, is fitted in notch 42.

Disk-shaped shoe 50 is mounted rockably and detachably on shoe mounting surface 14a on the top side of body 14. Shoe 50 includes metallic shoe body 51 with a circular plane shape, resin seat plate 52 disposed on the top face of body 51, and camera screw 53 in the central portion of body 51. Screw 53 can be turned by manually operating folding knob 53a. Hollow 54 is formed in the center of the bottom surface of shoe 50. Knob 53a can be housed entirely in hollow 54 when it is folded. The outside diameter of shoe body 51 is equal to that of shoe mounting surface 14a.

Figures 5, 6:
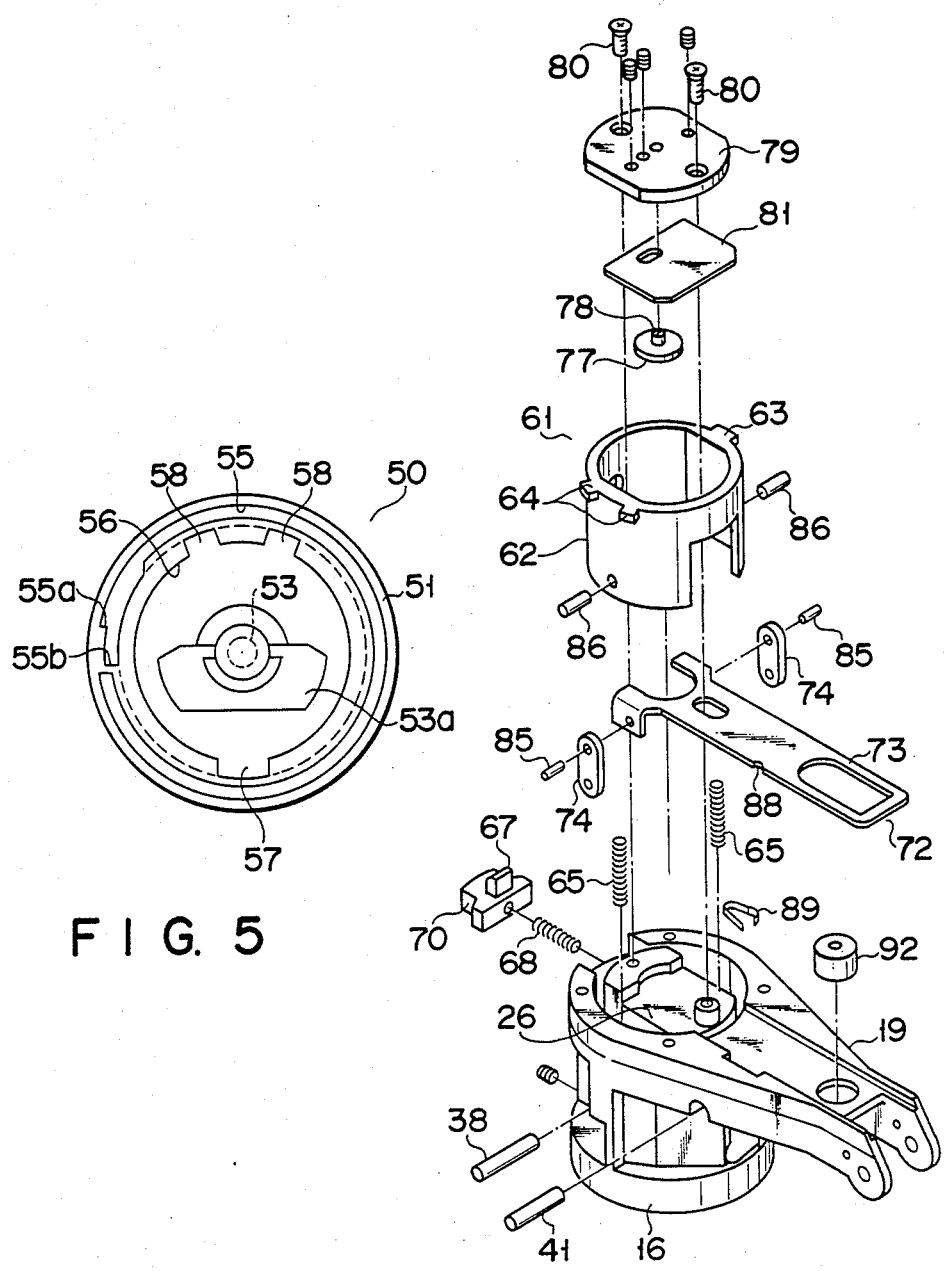
FIG. 5 is a bottom view of the shoe shown in FIG. 1.
FIG. 6 is a partial exploded perspective view of the camera supporting device shown in FIG. 1.
Figure 7:
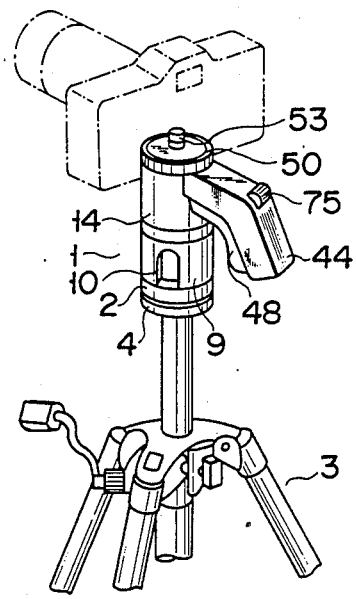
FIG. 7 is a perspective view of the camera supporting device shown in FIG. 1, mounted on a tripod.

Circumferential groove 55 and inward flange 56 are arranged on the bottom side of shoe body 51. Flange 56 is formed with notches 57 and 58 in which hooks 63 and 64 can be fitted, respectively, as mentioned later. As is shown in FIG. 5, two stoppers 55a and 55b are provided at one end side of groove 55, with respect to the circumferential direction thereof. The bottom surface of shoe body 51 is finished flat, so that the shoe body can be placed stably on a flat base.

Body 14 is provided with fixing/releasing mechanism 61 used to attach or detach shoe 50 to or from body 14. Mechanism 61 includes cylindrical lock member 62 which can move vertically with respect to body 14. Outward hooks 63 and 64 are provided on the upper end of lock member 62, corresponding in position to notches 57 and 58, respectively. Projecting over shoe mounting surface 14a, hooks 63 and 64 can engage flange 56. These hooks can be fitted into notches 57 and 58 only when shoe 50 is rotated to a predetermined position (release position). Lock member 62 is urged upward by compression coil spring 65 (see FIG. 6).

Fixing/releasing mechanism 61 has claw 67 which, pressed by spring 68, is adapted to be fitted into groove 55. Claw 67 is used to temporarily stop shoe 50 in the middle of its rotation toward the release position. More specifically, claw 67 abuts against first stopper 55a immediately before shoe 50 reaches the release position, e.g., when the shoe is situated about 20° short of the release position. Claw 67 can be moved to a position such that it is disengaged from stopper 55a, by depressing control button 70.

Drive mechanism 72 for vertically moving lock member 62 includes sliding plate 73, a pair of links 74, operating member 75, etc. Sliding plate 73 can slide substantially only in its longitudinal direction, since it is restrained from moving vertically by trigger supporting portion 19 and seat 81. Stopper plate 77 has eccentric shaft 78, which is inserted in a hole in plate 79. The forward stroke of sliding plate 73 can be changed by turning shaft 78 by means of a screwdriver to adjust the position of stopper plate 77. Plate 79 is fixed to frame 16 by means of screws 80. Seat 81 is interposed between plate 79 and frame 16.

Links 74 are swingably mounted on the front end portion of sliding plate 73 by means of their corresponding pins 85. The lower end of each link 74 is pivotally mounted on lock member 62 by means of pin 86. As sliding plate 73 advances, therefore, lock member 62 ascends slightly. Sliding plate 73 is provided, in its side portion, with recess 88 and resilient member 89 adapted to be fitted into recess 88, whereby a feeling of clicking can be obtained when plate 73 reaches a predetermined position in its forward stroke. The rear end of plate 73 is in engagement with recess 90 of operating member 75. Level vial 92 is disposed on the top face of grip 44. It is used to monitor the levelness of body 14.

The operation of camera supporting device 1, constructed in this manner, will now be described. If operating member 75 is manually forced up to the position indicated by two-dot chain line in FIG. 1, sliding plate 73 advances to its first position, and links 74 tilt forward. As the links tilt in this manner, lock member 62 ascends slightly. As a result, hooks 63 and 64 leave flange 56 of shoe 50, so that the shoe is allowed to rotate.

If operating member 75 is lowered to the position indicated by full lines in FIG. 1, on the other hand, sliding plate 73 moves back to its second position. Thereupon, links 74 are restored to their upright position, so that lock member 62 lowers. Accordingly, flange 56 is held between hooks 63 and 64 and shoe mounting surface 14a. By a frictional force produced at this time, shoe 50 is disabled from rotating.

In removing shoe 50, operating member 75 is moved to the position indicated by two-dot chain line in FIG. 1. Then, shoe 50, which can rotate in this state, as mentioned before, is rotated until first stopper 55a engages claw 67. In this state, however, shoe 50 cannot be removed. In order to remove shoe 50, therefore, claw 67 and stopper 55a are disengaged from each other by depressing button 70, and shoe 50 is rotated until claw 67 engages second stopper 55b. When shoe 50 is rotated to the release position, in this manner, hooks 63 and 64 are aligned with their corresponding notches 57 and 58. Thus, shoe 50 can be removed from body 14.

Removed shoe 50 can be fixed to a camera by screwing camera screw 53 into a threaded socket of the camera. After it is mounted on the camera in this manner, shoe 50 is fixed to shoe mounting surface 14a. In doing this, shoe 50 is pressed against surface 14a while aligning hooks 63 and 64 with notches 57 and 58. Then, shoe 50 is rotated to a position where claw 67 is situated beyond first stopper 55a. Operating member 75 is manually pushed down after rotating shoe 50 to a desired position, in consideration of the camera direction. Thus, shoe 50 is fixed at the desired position.

In adjusting the camera angle, trigger 48 is squeezed or pulled toward grip 44. Thereupon, trigger 48 rocks around shaft 47, so that third link 33 rocks clockwise around pin 41. As second and first links 32 and 31 ascend, columnar portion 21a of ball retainer 21 moves away from ball 7. Accordingly, ball case 8 is allowed to rotate relatively to ball 7. Thus, body 14 and the camera can be oriented in any desired direction.

Figure 8:
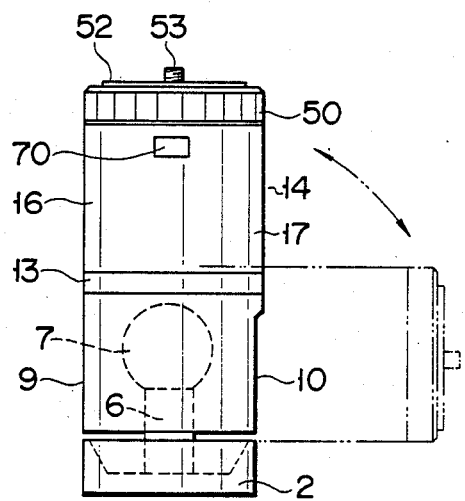
FIG. 8 is a front view of the camera supporting device shown in FIG. 1.

For example, body 14 can be thrown down sideways as indicated by two-dot chain line in FIG. 8. When trigger 48 is squeezed, the urging force of spring 25 ceases to act on the contact portion between ball case 8 and metal fitting 13, so that case 8 becomes rotatable with respect to body 14. Thus, cover 9 can be rotated so that notch 10 is situated in a position such that body 14 is allowed to fall sideways.

When trigger 48 is released, ball 7 is clamped strongly between surface 22 of ball retainer 21 and edge 8a of ball case 8 by the urging force of spring 25. As a result, body 14 is fixed to fixed base 2 with ball 7 between them.

Figure 9:
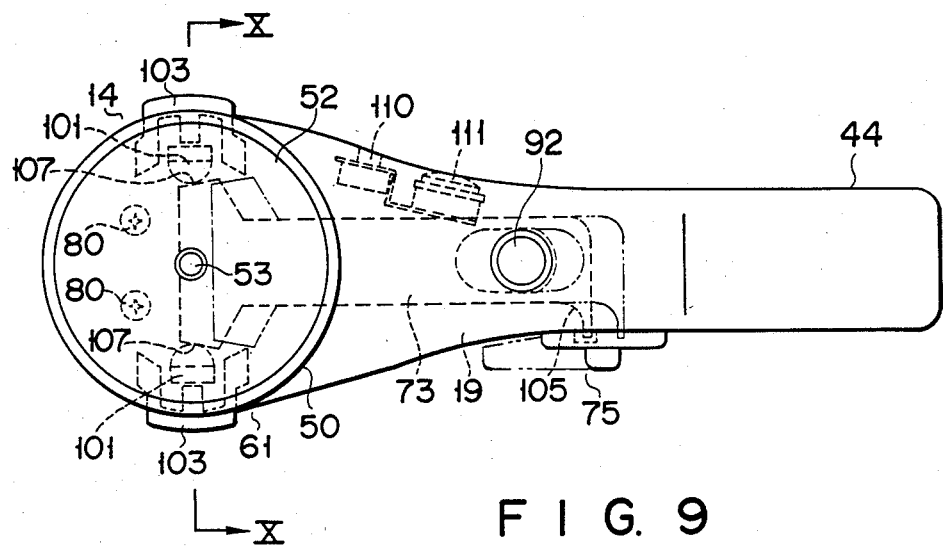
FIG. 9 is a plan view of a camera supporting device according to a second embodiment of the invention.
Figure 10:
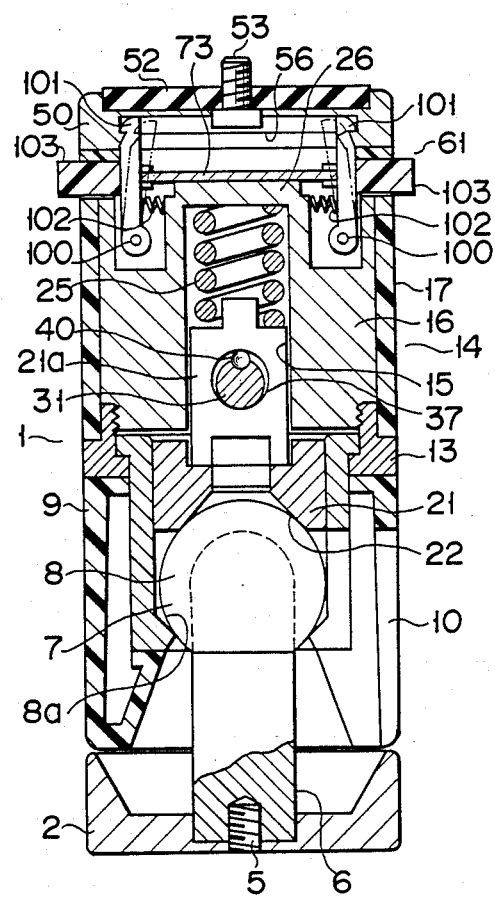
FIG. 10 is a longitudinal sectional view taken along line X—X of FIG. 9.

FIGS. 9 to 10 show a second embodiment of the present invention. Shoe fixing/releasing mechanism 61 of this embodiment includes a pair of hook-shaped lock members 101 which rock around pin 100. Lock members 101 can engage flange 56 of shoe 50. Spring 102 is interposed between each lock member 101 and frame 16.

Body 14 is provided with buttons 103 which are used to press lock members 101. Sliding plate 73, which has a substantially T-shaped plane shape, can reciprocate in its longitudinal direction. Projection 105 protrudes sideways from the rear end of plate 73. It engages operating member 75 on the lateral face of grip 44. If operating member 75 is moved counterclockwise, sliding plate 73 advances to its first position indicated by the broken line in FIG. 9. If member 75 is moved clockwise, on the other hand, plate 73 moves back to its second position indicated by the two-dot chain line.

Tapered surfaces 107 are formed at the front end of sliding plate 73. When plate 73 advances to the first position, surfaces 107 press their corresponding lock members 101. Thus, lock members 101 are pressed against flange 56, thereby fixing shoe 50. When sliding plate 73 moves back to the second position, surfaces 107 leave lock members 101. If buttons 103 are then depressed, members 101 are disengaged from flange 56, so that shoe 50 is allowed to be removed. Grip 44 is provided, on its flank, with plug socket 110, which is used to connect an electromagnetic release cord, and switch 111 for the remote control of the shutter of the camera.

What is claimed is:

1. A camera supporting device adapted to be mounted on a tripod, comprising:
    a base mountable on a tripod;
    a post provided on said base, said post having a top end;
    a ball mounted on said top end of said post;
    a cylindrical ball case for rotatably holding said ball, said ball case having a pair of open ends, one of said open ends having an edge on the inside thereof in contact with said ball, said ball case having a longitudinal axis;
    a ball retainer located at the other of said open ends of said ball case and being movable along said axis of said ball case, said ball retainer having a surface in contact with said ball;
    a body connected to said ball case and having a shoe-mounting surface;
    spring means located inside said body for urging said ball retainer toward said ball;
    a link mechanism coupled to said body for driving said ball retainer in a direction such that said ball retainer moves away from said ball, against the urging force of said spring means;
    a grip coupled to said body and shaped so as to permit a one-handed hold thereof;
    a trigger rockably coupled to said grip, and being coupled to said link mechanism for moving said link mechanism in a direction such that said ball retainer moves away from said ball when said trigger is squeezed;

a shoe fitted with a camera screw, said camera screw having an extreme end projecting from an upper surface of said shoe; and shoe fixing/releasing means for detachably fixing said shoe to said shoe-mounting surface of said body;

said shoe-fixing/releasing means including:

an inward circular flange formed on a bottom side of said shoe, said flange extending along a circumference of a circle surrounding said camera screw;

at least one notch in said inward flange;

a lock member mounted on said body for vertical movement, said lock member having, at an upper end thereof, a hook means for engaging said flange and adapted to enter said notch when said shoe is rotated to a predetermined release position, said flange being clamped between said hook means and said shoe-mounting surface when said lock member is lowered;

a sliding plate mounted on said body and being movable back and forth relative to said body;

link means connecting one end of said sliding plate to said lock member for raising said lock member when said sliding plate is moved from a first position to a second position, and for lowering said lock member when said sliding plate is moved from said second position to said first position; and an operating member attached to said grip, said operating member being coupled to the other end of said sliding plate for reciprocating said sliding plate between said first and second positions thereof.

2. The camera supporting device according to claim 1, wherein:

said shoe comprises, on a bottom side thereof, a groove extending along a circumference of a circle concentric with said camera screw;

a stopper is provided on one end side of said groove, with respect to the circumferential direction thereof; and said body comprises a claw which is engageable in said groove, said claw being adapted to abut against said stopper for temporarily stopping rotation of said shoe while said shoe is rotating to a release position thereof, said shoe being rotatable to said release position when said claw is disengaged from said stopper by being pressed.

3. The camera supporting device according to claim 1, wherein:

said shoe is disk-shaped and has a center;

said camera screw is located at said center of said disk-shaped shoe;

a foldable knob is coupled to said screw; and said shoe has, on said bottom side thereof, a recess large enough to contain said foldable knob therein, said foldable knob being adapted to be housed entirely within said recess when in a folded state.

4. The camera supporting device according to claim 1, wherein said inward flange is concentric with said screw.

5. The camera supporting device according to claim 1, wherein said grip is integrally formed with said body as one continuous piece.

6. The camera supporting device according to claim 1, wherein said grip is integrally connected to said body.

7. The camera supporting device according to claim 1, wherein said base is in a fixed position when mounted to a tripod.

8. The camera supporting device according to claim 1, wherein said spring means comprises a compression coil spring.

9. A camera supporting device adapted to be mounted on a tripod, comprising:

a base mounted on a tripod;

a post provided on said base, said post having a top end;

a ball mounted on said top end of said post;

a cylindrical ball case for rotatably holding said ball, said ball case having a pair of open ends, one of said open ends having an edge on the inside thereof in contact with said ball, said ball case having a longitudinal axis;

a ball retainer located at the other of said open ends of said ball case and being movable along said axis of said ball case, said ball retainer having a surface in contact with said ball;

a body connected to said ball case and having a shoe-mounting surface;

spring means located inside said body for urging said ball retainer toward said ball;

a link mechanism coupled to said body for driving said ball retainer in a direction such that said ball retainer moves away from said ball, against the urging force of said spring means;

a grip coupled to said body and shaped so as to permit a one-handed hold thereof;

a trigger rockably coupled to said grip, and being coupled to said link mechanism for moving said link mechanism in a direction such that said ball retainer moves away from said ball when said trigger is squeezed;

a disk-shaped shoe having a center;

a camera screw coupled to said disk-shaped shoe, said camera screw having an extreme end projecting from an upper surface of said shoe;

a foldable knob coupled to said screw and being located at a bottom side of said disk-shaped shoe;

said shoe having, on said bottom said thereof, a recess large enough to contain said foldable knob therein, said foldable knob being adapted to be housed entirely within said recess when in a folded state; and shoe fixing/releasing means for detachably fixing said shoe to said shoe-mounting surface of said body.

10. The camera supporting device according to claim 9, wherein:

said shoe comprises, on a bottom side thereof, a groove extending along a circumference of a circle concentric with said camera screw;

a stopper is provided on one end side of said groove, with respect to the circumferential direction thereof; and said body comprises a claw which is engageable in said groove, said claw being adapted to abut against said stopper for temporarily stopping rotation of said shoe while said shoe is rotating to a release position thereof, said shoe being rotatable to said release position when said claw is disengaged from said stopper by being pressed.

11. The camera supporting device according to claim 9, wherein said inward flange is concentric with said screw.

12. The camera supporting device according to claim 9, wherein said grip is integrally formed with said body as one continuous piece.

13. The camera supporting device according to claim 9, wherein said base is in a fixed position when mounted to a tripod.

14. The camera supporting device according to claim 9, wherein said spring means comprises a compression coil spring.

15. A camera supporting device adapted to be mounted on a tripod, comprising:
base means for mounting the camera supporting device on a tripod;
ball means fixedly coupled to said base means;
ball case mounted over said ball means for rotatably holding said ball means therein, said ball case having a pair of open opposite ends, one of said open ends having means on the inside thereof for contacting said ball means;
a ball retainer located at the other of said open ends of said ball case and being movable toward and away from said ball means, said ball retainer having a surface adapted to contact with said ball means for retaining said ball means in a fixed position relative to said ball retainer;
a body coupled to said ball case and having a shoe-mounting surface;
spring means coupled to said ball retainer for urging said ball retainer toward said ball means;
a link mechanism movably coupled to said body for driving said ball retainer in a direction such that said ball retainer moves away from said ball means, against the urging force of said spring means;
a grip coupled to said body and shaped so as to permit a gripping thereof by a user;
trigger means rockably coupled to said grip, and being coupled to said link mechanism for moving said link mechanism in a direction such that said ball retainer moves away from said ball means when said trigger means is squeezed;
a shoe fitted with a camera screw, said camera screw having an extreme end projecting from an upper surface of said shoe; and
shoe fixing/releasing means for detachably fixing said shoe to said shoe-mounting surface of said body;
said shoe-fixing/releasing means including:
an inward circular flange formed on a bottom side of said shoe, said flange extending along a circumference of a circle surrounding said camera screw;
at least one notch in said inward flange;
a lock member mounted on said body for vertical movement, said lock member having, at an upper end thereof, a hook means for engaging said flange and adapted to enter said notch when said shoe is rotated to a predetermined release position, said flange being clamped between said hook means and said shoe-mounting surface when said lock member is lowered;
a sliding plate mounted on said body and being movable back and forth relative to said body;
link means connecting one end of said sliding plate to said lock member for raising said lock member when said sliding plate is moved from a first position to a second position, and for lowering said lock member when said sliding plate is moved from said second position to said first position; and
an operating member attached to said grip, said operating member being coupled to the other end of said sliding plate for reciprocating said sliding plate between said first and second positions thereof.

16. The camera supporting device according to claim 15, wherein:
said shoe comprises, on a bottom side thereof, a groove extending along a circumference of a circle concentric with said camera screw;
a stopper is provided on one end side of said groove, with respect to the circumferential direction thereof; and
said body comprises a claw which is engageable in said groove, said claw being adapted to abut against said stopper for temporarily stopping rotation of said shoe while said shoe is rotating to a release position thereof, said shoe being rotatable to said release position when said claw is disengaged from said stopper by being pressed.

17. The camera supporting device according to claim 15, wherein said grip is integrally connected to said body.

18. The camera supporting device according to claim 15, wherein said spring means comprises a compression coil spring.

19. A camera supporting device adapted to be mounted on a tripod, comprising:
base means for mounting the camera supporting device on a tripod; means;
ball means fixedly coupled to said base means;
ball case mounted over said ball means for rotatably holding said ball means therein, said ball case having a pair of open opposite ends, one of said open ends having means on the inside thereof for contacting said ball means;
a ball retainer located at the other of said open ends of said ball case and being movable toward and away from said ball means, said ball retainer having a surface adapted to contact with said ball means for retaining said ball means in a fixed position relative to said ball retainer;
a body coupled to said ball case and having a shoe-mounting surface;
spring means coupled to said ball retainer for urging said ball retainer toward said ball means;
a link mechanism movably coupled to said body for driving said ball retainer in a direction such that said ball retainer moves away from said ball means, against the urging force of said spring means;
a grip coupled to said body and shaped so as to permit a gripping thereof by a user;
trigger means rockably coupled to said grip, and being coupled to said link mechanism for moving said link mechanism in a direction such that said ball retainer moves away from said ball means when said trigger means is squeezed;
a disk-shaped shoe coupled to said shoe-mounting surface of said body, said shoe having a center;
a camera screw coupled to said disk-shaped shoe and being located at said center of said disk-shaped shoe, said camera screw having an extreme end projecting from an upper surface of said shoe;
a foldable knob coupled to said screw and being located at a bottom side of said disk-shaped shoe;

said shoe having, on said bottom side thereof, a recess large enough to contain said foldable knob therein, said foldable knob being adapted to be housed entirely within said recess when in a folded state.

20. The camera supporting device according to claim 19, wherein:

said shoe comprises, on a bottom side thereof, a groove extending along a circumference of a circle concentric with said camera screw;

a stopper is provided on one end side of said groove, with respect to the circumferential direction thereof; and said body comprises a claw which is engageable in said groove, said claw being adapted to abut against said stopper for temporarily stopping rotation of said shoe while said shoe is rotating to a release position thereof, said shoe being rotatable to said release position when said claw is disengaged from said stopper by being pressed.

21. The camera supporting device according to claim 19, wherein said grip is integrally connected to said body.

22. The camera supporting device according to claim 19, wherein said spring means comprises a compression coil spring.

* * * * *